United States Patent
Decker

(10) Patent No.: US 6,256,852 B1
(45) Date of Patent: Jul. 10, 2001

(54) ANTI-FLASHOVER RING INSTALLATION TOOL AND METHOD FOR USING THE SAME

(75) Inventor: Edward H. Decker, Rogersville, TN (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/235,092

(22) Filed: Jan. 21, 1999

(51) Int. Cl.$^7$ ..................................................... B23P 19/02
(52) U.S. Cl. ................................ 29/235; 29/229; 29/752
(58) Field of Search .............................. 29/222, 235, 229, 29/269, 282, 750, 752

(56) References Cited

U.S. PATENT DOCUMENTS

| D. 345,681 | * | 4/1994 | Bruzzi ........................................ D8/14 |
| 3,263,318 | * | 8/1966 | Merrill ........................................ 29/212 |
| 3,538,575 | * | 11/1970 | Roland ........................................ 29/888 |
| 3,704,505 | * | 12/1972 | Lacer, Jr. et al. ............................. 29/235 |
| 3,953,099 | | 4/1976 | Wilson . |
| 3,981,066 | * | 9/1976 | Calvert ........................................ 29/451 |
| 3,995,360 | * | 12/1976 | Millheiser .................................... 29/229 |
| 4,141,129 | * | 2/1979 | Martini ........................................ 29/235 |
| 4,260,214 | | 4/1981 | Dorn . |
| 4,346,612 | * | 8/1982 | Rand ........................................ 73/864.44 |
| 4,571,804 | * | 2/1986 | Grabler et al. .............................. 29/235 |
| 4,793,637 | | 12/1988 | Laipply et al. . |
| 4,822,291 | | 4/1989 | Cunningham . |
| 4,845,822 | * | 7/1989 | Hutson ........................................ 29/235 |
| 4,867,687 | | 9/1989 | Williams et al. . |
| 4,905,548 | * | 3/1990 | Colace et al. ............................... 81/177.2 |
| 4,972,049 | | 11/1990 | Muench . |
| 5,050,282 | * | 9/1991 | Zannini ........................................ 29/235 |
| 5,138,752 | * | 8/1992 | Tasner ........................................ 29/235 |
| 5,343,607 | * | 9/1994 | Southerland, Jr. et al. .................. 29/229 |
| 5,641,310 | | 6/1997 | Tiberio, Jr. . |
| 5,795,180 | | 8/1998 | Siebens . |
| 5,816,835 | | 10/1998 | Meszaros . |
| 5,857,862 | | 1/1999 | Muench et al. . |
| 5,862,578 | * | 1/1999 | Castleman .................................. 29/235 |
| 5,875,536 | * | 3/1999 | Ring ........................................ 29/407.1 |
| 5,909,909 | * | 6/1999 | Glauber ...................................... 29/235 |
| 5,957,712 | | 9/1999 | Stepniak . |
| 6,035,747 | * | 3/2000 | Valela ........................................ 81/177.2 |
| 6,038,753 | * | 3/2000 | Willett ........................................ 29/235 |

FOREIGN PATENT DOCUMENTS

| 1559211 | * | 1/1980 | (GB) ............................................. 29/450 |
| 0039277 | * | 3/1979 | (JP) ............................................. 29/450 |

* cited by examiner

Primary Examiner—S. Thomas Hughes
Assistant Examiner—Essama Omgba
(74) Attorney, Agent, or Firm—Mark S. Bicks; Tara L. Hoffman

(57) ABSTRACT

A tool (10) for installing an anti-flashover ring (140) onto a cylindrical device includes a housing (12) with an inner wall (24) with an extending edge (26). A plunger assembly (50) is slidably coupled to the housing (12) and carries the ring (140). The cylindrical device or bushing insert is received in the housing and the plunger assembly positions the ring onto the cylindrical device and the extending edge presses the ring onto the cylindrical device. A rod axially disposed in the housing and fixed to the plunger assembly is received in a bore (119) of the bushing insert (110) and assists in the positioning of the ring. The plunger assembly (50) includes a plunger (52) having a closed end (54) opposite an open end, the plunger has an interior plunger wall (60) with a spring lip (66). A holding collar (90) is slidably received in the plunger and a collar spring (100) is disposed between the plunger and the holding collar for biasing the holding collar. The holding collar carries the ring until engaged by the bushing insert.

17 Claims, 4 Drawing Sheets

ANTI-FLASHOVER RING INSTALLATION TOOL AND METHOD FOR USING THE SAME

TECHNICAL FIELD

This invention relates generally to a tool for mounting a safety device on high voltage electrical equipment. Specifically, the present invention relates to a tool for installing an anti-flashover ring that fits on an electrical accessory product. More particularly, the present invention relates to an installation tool that allows installation of the anti-flashover ring at a safe distance from the high voltage electrical equipment whether energized or de-energized.

BACKGROUND ART

As discussed in co-pending U.S. application Ser. No. 09/085,801, entitled "Anti-Flashover Ring For A Bushing Insert" and assigned to the Assignee of the present application, which is incorporated herein by reference, there is a need to eliminate electrical arcing during disconnection of a live source of power. As discussed therein, an anti-flashover ring for an accessory product such as a bushing insert was developed to significantly reduce this risk.

Electrical accessory products such as bushing inserts, which are typically rated for 15 kV, 25 kV, or 35 kV, are all dimensionally sized according to ANSI/IEEE Standard 386. This standard defines the various dimensional and electrical operating aspects of the electrical accessory products so that products from different manufacturers may be interchangeable. Even with these standards, it will be appreciated that there are slight dimensional variations between accessory products from different manufacturers.

There are several ways in which the anti-flashover ring can be installed on a bushing insert. The easiest way to install the ring is to place it on the bushing insert before the bushing insert is installed on high voltage electrical equipment such as a transformer. However, it will be appreciated that there are many such bushing inserts and other related accessory products already installed in the field. In order to install the anti-flashover ring onto these installed bushing inserts and the like, safe operating practice requires that all downstream equipment be de-energized. Next, the bushing insert may be removed from the transformer and the anti-flashover ring is installed on the bushing insert by hand. The bushing insert is then reinstalled and the downstream equipment is re-energized. As will be appreciated by those skilled in the art, this is a very expensive and time-consuming process and one not favored by public utility companies. Alternatively, the anti-flashover ring could be installed without removing the bushing insert from the high voltage equipment, but this is considered a dangerous option and safety practices of public utilities generally prevent this option. In order to implement this option, an operator would be required to hand install the anti-flashover ring directly onto the connected bushing insert. Hand installation is also undesirable because the dimensional variations of the bushing inserts may require special care by the installer to ensure that the ring is uniformly and properly mounted to the bushing insert.

It is thus desired in the art to provide a tool which may be adaptable for operation or use by a "hot stick" or insulated operation tool. Furthermore, it is desired that the tool and its method for use ensure that the anti-flashover ring is properly installed onto the accessory product in an efficient and secure manner.

SUMMARY OF INVENTION

In light of the foregoing, it is a first aspect of the present invention to provide an anti-flashover ring installation tool and method for using the same.

Another aspect of the present invention is to provide an anti-flashover ring installation tool that may be used with an insulated hot stick to allow safe and proper installation of the ring.

Yet another aspect of the present invention is to provide an installation tool, as set forth above, which provides alignment features prior to installing the ring onto an accessory product such as a bushing insert.

Still another aspect of the present invention is to provide an installation tool, as set forth above, that includes a housing with a spring-biased plunger assembly that positions the ring onto the bushing insert and then presses the ring onto the bushing insert.

Still yet another aspect of the present invention, as set forth above, is to provide the plunger assembly with an insert cavity having a coaxially extending rod that is received by the bushing insert during installation.

A further aspect of the present invention is to provide an installation tool, as set forth above, in which the plunger assembly includes a spring-biased holding collar which frictionally carries the ring and wherein the holding collar is slidably moveable within the plunger assembly.

Still a further aspect of the present invention is to provide an installation tool, as set forth above, wherein the holding collar contacts a surface of the bushing insert and is pushed back while a plunger in the plunger assembly positions the ring onto a shoulder of the bushing insert.

An additional aspect of the present invention is to provide an installation tool, as set forth above, in which the housing provides a final push of the anti-flashover ring until seated and frictionally held by the bushing insert.

The foregoing and other aspects of the present invention, which shall become apparent as the detailed description proceeds, are achieved by a tool for installing a ring onto a cylindrical device, comprising a housing having an inner wall with an extending edge, the inner wall defining an opening, a plunger assembly slidably coupled to the housing, the plunger assembly carrying the ring wherein the cylindrical device is received in the opening and the plunger assembly positions the ring about the cylindrical device and the extending edge presses the ring onto the cylindrical device.

Other aspects of the present invention are attained by an installation tool for installing an anti-flashover ring on an electrical accessory product such as a bushing insert, the tool comprising a housing having a cap at one end and a cup at an opposite end, the cap having a hole therethrough to receive a remote operating tool, the cup having a closed end with a bore therethrough adjacent the cap, and an open end opposite the closed end, the cup having a substantially flat cup edge at the open end, a rod slidably moveable in the bore, one end of the rod slidably mounted in the cap, a plunger slidably received in the cup, the plunger having a closed end with a rod hole therethrough, the rod fixed to the rod hole, the plunger having an open end opposite the plunger closed end, the plunger open end facing the same direction as the open end of the cup, the plunger open end having an insert cavity into which the rod coaxially extends, the plunger having an interior plunger wall with a sleeve lip and a spring lip, a spring disposed between the plunger and the cup, a sleeve mounted to the sleeve lip, a holding collar slidably movable between the sleeve and the interior plunger wall and retained within the plunger, and a collar spring disposed between the holding collar and the spring lip, the holding collar frictionally receiving the ring, wherein an operator positions the installation tool such that the rod is received by the bushing insert, the holding collar aligns the ring onto a shoulder of the bushing insert, wherein the shoulder pushes the holding collar until the plunger engages the anti-flashover ring to complete positioning of the ring onto the shoulder, and wherein the shoulder and the ring slidably move the plunger until engaged by the cup edge which completely pushes the ring onto the shoulder.

Still another object of the present invention is attained by a method for installing an anti-flashover ring onto a bushing insert, wherein the ring has an outer surface and an inner surface, and a shoulder wall extending inwardly from the inner surface, the shoulder wall having a shoulder surface, and wherein the bushing insert has a frusto-conical portion with a bore therethrough, the frusto-conical portion terminating at a shoulder which extends into a shielded collar, the method comprising the steps of positioning the ring on a spring-biased plunger assembly slidably received in a cup, the plunger assembly having an insert cavity for receiving the frusto-conical portion and a rod extending substantially coaxially into the insert cavity, aligning the spring-biased plunger assembly onto the bushing insert by inserting the rod into the bore, moving the plunger assembly until the ring is positioned onto the shoulder, further moving the plunger assembly until retracted within the cup wherein the cup pushes the ring onto the shoulder, and withdrawing the cup and the plunger assembly from the insert.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

Figures 1, 2:
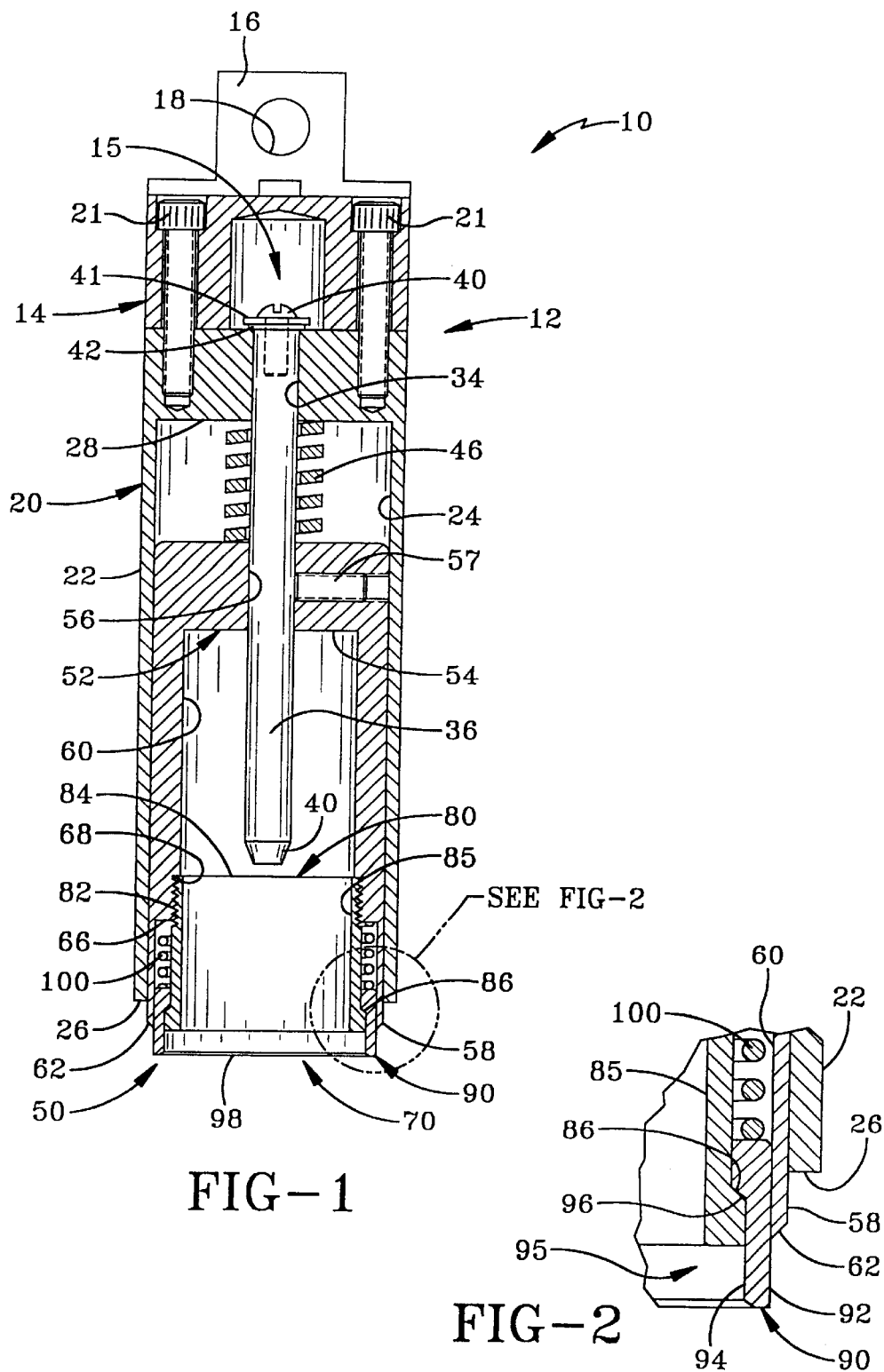
FIG. 1 is a cross-sectional elevation view of an anti-flashover ring installation tool.
FIG. 2 is an enlarged view of a plunger assembly end of the installation tool.
Figure 3:
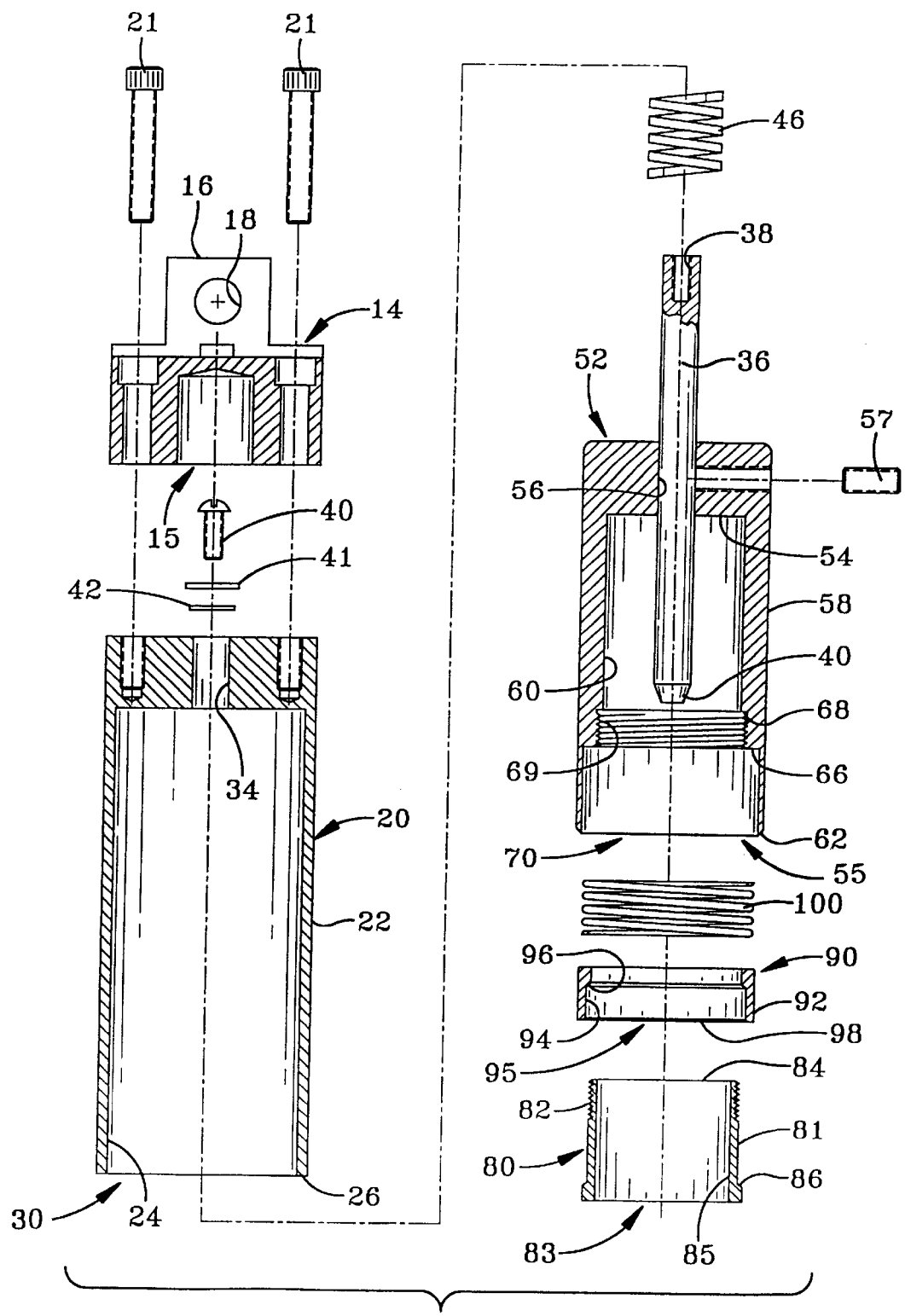
FIG. 3 is an assembly drawing of the installation tool.

Referring now to the drawings, and more particularly, to FIGS. 1–3, it can be seen that an anti-flashover ring installation tool, according to the present invention, is designated generally by the numeral 10. The tool 10 is generally cylindrical in shape and may be fabricated from a non-conductive polymeric material. Although the tool 10 is adapted for installing an anti-flashover ring, it will be appreciated that the tool 10 is structurally capable of installing any type of ring onto a cylindrical device.

The tool 10 includes a housing 12 which is generally cylindrical in shape. The housing 12 includes a cap 14 which is closed at one end and open at its opposite end. The cap 14 provides an axial bore 15. Extending from the closed end of the cap 14 is a tab 16 which has a transverse hole 18 therethrough. The hole 18 is employed to receive a hot stick or other operator tool to allow safe handling of the installation tool 10 away from the high-voltage equipment. This precaution is taken even though the high voltage equipment is shut down at a remote distance from the equipment.

The housing 12 further includes a cup 20 which is secured to the cap 14 by fastening devices 21. Of course, other means for securing the cup 20 to the cap 14 could be employed such as adhesive, detents, clamps, or the like. The cup 20 includes an outer wall 22 and an inner wall 24 which are connected by a cup edge 26. In the preferred embodiment, the cup edge 26 is substantially flat and perpendicular with respect to the outer wall 22 and the inner wall 24. The cup 20 includes a cup base 28 opposite the cup edge 26 so as to form a cup cavity or opening 30 within the cup 20. The cup base 28 has a hole 34 extending therethrough which is aligned with the axial bore 15 of the cap 14.

A positioning rod 36, which in the preferred embodiment is made of fiberglass or other non-conductive material, is slidably moveable in the cup base 28 through the hole 34. It will be appreciated that the rod 36 is positioned to be substantially co-axial with the inner wall 24. The rod 36 includes an internally threaded bore 38 at one end which is opposite a tapered end 40. In assembling the installation tool 10, the rod 36 is inserted through the hole 34 and then a screw 40 fastens a flat washer 41 and an O-ring 42 to the rod 36 to slidably retain the end of the rod in the cap. It will be appreciated that a pin, C-clip, or other device which is larger in diameter than the hole 34 may be used to slidably retain one end of the rod 36 in the cap 14. After this manufacturing step is complete, the cup 20 is assembled to the cap 14 such that one end of the rod 36 is captured within the cup 20. A rod spring 46 is disposed over the rod 36 and positioned or biased at one end by the cup base 28.

A plunger assembly, which is designated generally by the numeral 50, is biasingly received within the housing 12. Generally, the plunger assembly 50 receives the anti-flashover ring and positions the ring upon the bushing insert in a secure and efficient manner.

The plunger assembly 50 includes a plunger 52 which is substantially tubular in shape. The plunger 52 provides a closed end 54 with a rod hole 56 extending therethrough and an open end 55. The rod 36 is received through the rod hole 56 and is held in place by a set screw 57 or other fastening device. Alternatively, the hole carrying the set screw could extend all the way through the base 54 and receive a press fit pin, wherein the rod 36 is also modified to receive the pin. As such, the secured rod 36 could be replaced by removing the pin. Of course, other fastening devices could be employed to hold the rod 36 in the plunger 52. The plunger 52 includes an exterior plunger wall 58 which slidably moves adjacent the cup inner wall 24. An interior plunger wall or inner surface 60 is connected to the exterior plunger wall 58 by a tapered end 62. In other words, the tapered end 62 provides an angular transition from the exterior plunger wall 58 to the interior plunger wall 60. An inwardly-stepped spring lip 66 and an inwardly-stepped sleeve lip 68 are provided by the interior plunger wall 60. That portion of the interior plunger wall 60 between the spring lip 66 and the sleeve lip 68 provides an internally threaded section 69. The interior plunger wall 60 forms an insert or inner cavity 70 which allows positioning of the installation tool 10 over an electrical accessory product. It can be seen that the rod 36 extends into the insert cavity 70 and is substantially coaxial therewith. Movement of the plunger 52 is biased by the rod spring 46. The plunger assembly 50 is held within the cup 20 by virtue of the rod 36 being fixed to the closed end 54 and retention of the rod in the cap 14.

A sleeve, which is designated generally by the numeral 80, is disposed within and attached to the plunger 52. The sleeve 80 includes an outer surface 81 with external threads 82 which mate with the internally threaded section 69 of the interior plunger wall 60. The sleeve 80 provides an opening 83 therethrough. The sleeve 80 has a lip end 84 which abuts the sleeve lip 68. An inner surface 85 of the sleeve 80 is substantially flush with that portion of the interior plunger wall 60 adjacent the closed end 54. A shoulder 86 extends from the outer surface 82 at an end opposite the lip end 84.

A holding collar, which is designated generally by the numeral 90, is slidably received between the plunger 52 and the sleeve 80 when assembled. The holding collar 90 includes an outer or ring retaining surface 92 and an inner surface 94. The holding collar 90 is cylindrical in shape and has an opening 95 therethrough. A ledge 96 extends inwardly from the inner surface 94 at one end. The holding collar 90 provides a leading edge 98 opposite the ledge 96. A collar spring 100 is disposed between the ledge 96 and the spring lip 66.

In assembling the holding collar 90, the sleeve 80, and the collar spring 100 to the plunger 52, the holding collar 90 is slipped over the sleeve 80 such that the shoulder 86 abuts the ledge 96. The collar spring 100 is disposed over the outer surface 82 of the sleeve 80. This sub-assembly is then inserted into the plunger 52 such that the collar spring 100 is biased by the spring lip 66. The sleeve 80 is positioned to abut the sleeve lip 68 and secured to the plunger 52 by the threaded interconnection of section 69 and the threads 82. Alternatively, adhesive or other mechanical fastening devices could be used. When the entire installation tool 10 is assembled, it will be appreciated that the holding collar 90 is biased with respect to the plunger 52 and that the plunger 52 is biased with respect to the housing 12.

Figure 4:
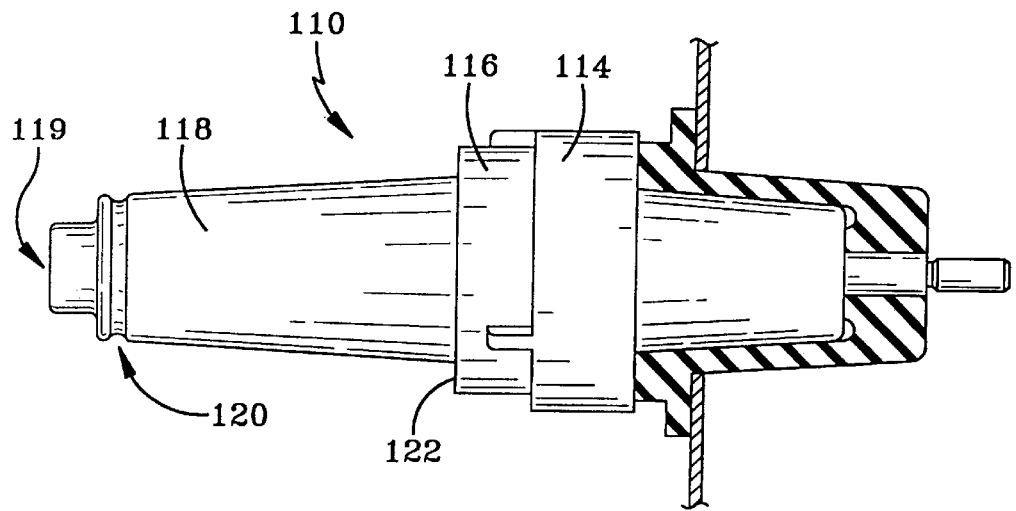
FIG. 4 is a side view, partially in section, of a bushing insert mounted to high-voltage equipment.
Figures 5, 6:
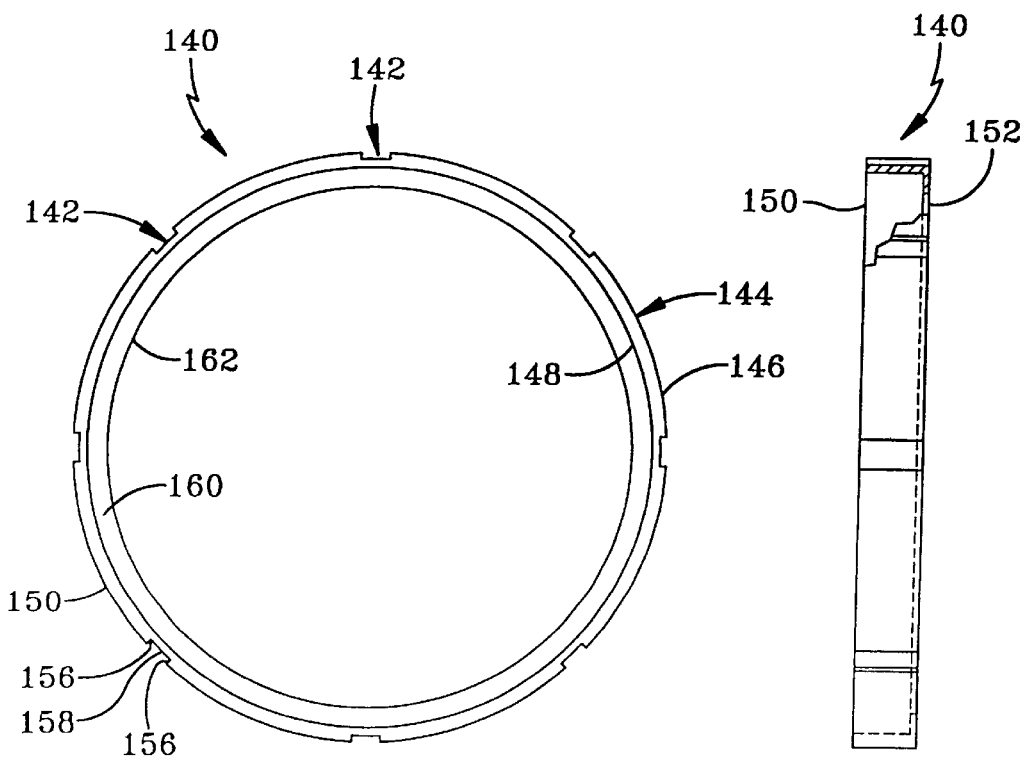
FIG. 5 is a rear elevational view of an anti-flashover ring.
FIG. 6 is a side elevational view of the anti-flashover ring.

To fully understand the operation of the installation tool 10, reference is now made to FIGS. 4–6. As best seen in FIG. 4, a bushing insert is designated generally by the numeral 110. The bushing insert 110 includes a semi-conductive shielded collar 114 that is substantially cylindrical but may be slightly tapered. A semi-conductive shielded sheath 116 extends from one end of the collar 114. The sheath 116 and the collar 114 provide protection and a ground shield for the bushing insert 110. A non-conductive frusto-conical portion 118 extends outwardly from the other end of collar 114 and terminates at an annular locking groove 120. A shoulder wall 122 forms the connection between the collar 114 and the frusto-conical portion 118. Shoulder wall 122 is disposed at a substantially right angle with respect to collar 114 and joins the frusto-conical portion 118 in a small chamfer. The bushing insert 110 provides internal electrical connection components therethrough to provide a medium for electrically connecting other connectors to electrical distribution equipment, such as transformers and the like. It will be appreciated that there is a bore 119 extending within the frusto-conical portion to a female-type contact within the insert 110.

In order to prevent arcing or flashing between the shielded collar 114 and mating electrical contacts, an anti-flashover ring, designated generally by the numeral 140, is employed. As best seen in FIGS. 5 and 6, the ring 140 is generally circular in shape and may be fabricated from a non-conductive material such as a thermoplastic elastomer. Whatever material is used, it is likely slightly expandable to fit over various sized bushing inserts or other electrical accessory products. Other suitable polymeric materials are also contemplated by the present invention. The ring 140 includes at least one passageway or notch, each indicated generally by the numeral 142, that functions to prevent a vacuum from being formed between the connector mounted onto the bushing insert 110 when separated from each other with the ring 140 properly positioned on the bushing insert 110.

The ring 140 includes a ring-shaped body 144 that has an outer surface 146 and at least one inner surface 148. A notch 142 extends transversely along outer surface 146 to provide an open path through body 144. In the preferred embodiment, each passageway or notch 142 extends in a longitudinal direction through body 144. The longitudinal direction being substantially perpendicular to all the radii of body 144. In other words, the passageways 142 are radially disposed along the outer periphery of body 144. The passageways 142 may be in the form of the notches as depicted in the drawings or may be channels interior to the body 144. The passageways may further be disposed along the inner surface 148.

The body 144 includes a pair of opposed side walls 150 and 152. The passageways 142 are formed in body 144 and are open to the outer surface 146 and extend from one side wall 150 to the other side wall 152, each passageway 142 includes substantially parallel side walls 156 that are connected to a bottom wall 158 that is substantially perpendicular to each side wall 156. The body 144 further includes a shoulder that is formed by a shoulder wall 160 that extends radially inwardly from the inner surface 148. The shoulder wall 160 provides a shoulder surface 162.

Referring now to FIGS. 7A–E, the process for using the installation tool 10 is presented. As a first step, the operator employs a hot stick or the like to grasp the cap 14. Next, the user positions the ring 140 unto holding collar 90 with plunger 52 in an extended position. It will be appreciated that the outer diameter of the holding collar 90 is equal to or slightly larger than the inner diameter of the shoulder surface 162. As such, once the user places the ring 140 onto the holding collar 90, the tool 10 can be moved about without the ring falling off. Of course, the ring 140 can be easily withdrawn with proper application of a pulling force.

Figure 7E:
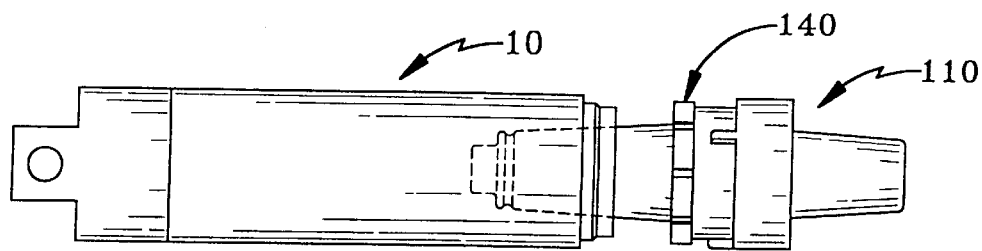
FIGS. 7A–E show the installation tool in various positions during installation of the anti-flashover ring on the bushing insert.
Figure 7D:
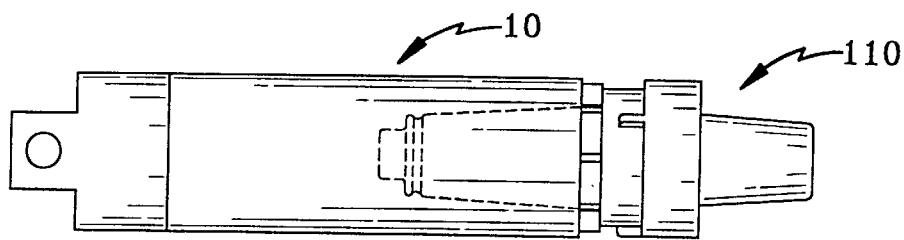
Figure 7C:
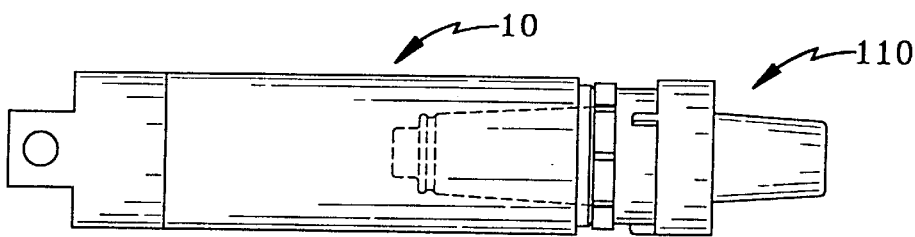
Figure 7B:
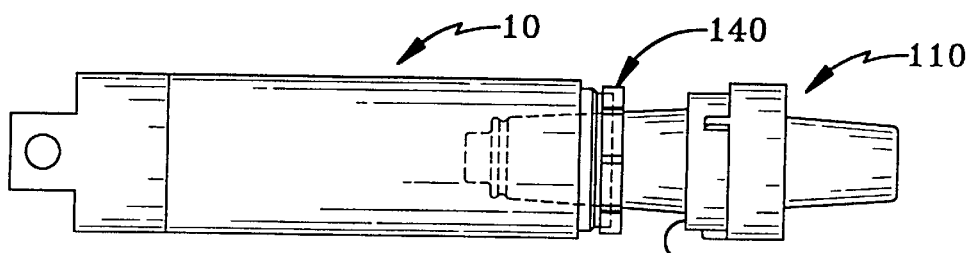
Figure 7A:
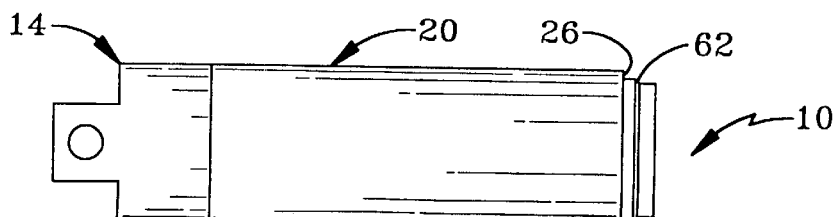

In FIG. 7B, the operator then positions the tool 10 over the bushing insert 110. As this is done, the rod 36 is inserted into the bore 119 provided by the frusto-conical portion 118. This functions to align the tool 10 onto the bushing insert 110.

As seen in FIG. 7C, the operator continues to move the tool 10 until the holding collar 90 comes in contact with the shoulder 122. At this time, the outer surface 146 is aligned over the collar 114. As the tool 10 is pushed forward, the shoulder 122 pushes the holding collar 90 and the collar spring 100 positioned between the outer sleeve surface 82 and the interior plunger wall 60 is compressed toward a retracted position. When the holding collar 90 becomes flush with the tapered end 62, the plunger 52 is in a retracted position and the tapered end edges into the ring 140 and causes it to slightly bow out from its bottom. This helps the ring to fit around the shoulder 122 of the bushing 110.

As seen in FIG. 7D, the applied force of the plunger 52 initially pushes the ring 140 onto the bushing. As the tapered end 62 engages the ring 140 and the shoulder wall 122, the plunger 52 is pushed back into the cup 20. Once the tapered end 62 is flush with the cup edge 26, the cup 20 presses and seats the ring 140 into its final position. At this time, the ring is seated and frictionally held in place by the collar 122 and the tool is released from the bushing insert as seen in FIG. 7E.

As can be seen from the foregoing structure of the tool 10 and its operation of use, several advantages of the present invention are readily apparent. Primarily, use of the tool 10 allows for installation of the anti-flashover ring onto a bushing insert without completely de-energizing a transformer associated with the bushing insert. This saves down time and accordingly, costs for the utility. Another advantage of the present invention is that it is adaptable for use with a hot stick to allow an operator to install the anti-flashover ring at a safe distance. Still yet another advantage of the present invention is that it ensures that the anti-flashover ring is properly installed in a uniform and efficient manner.

Thus, it can be seen that the objects of the invention have been attained by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A tool for installing a ring onto a cylindrical device, comprising:
   a housing having an inner wall with an extending edge, said inner wall defining an opening; and
   a plunger assembly slidably coupled to said housing, said plunger assembly carrying the ring wherein the cylindric device is received in said opening and said plunger assembly positions the ring about the cylindrical device and said extending edge presses the ring onto the cylindrical device,
   said plunger assembly includes,
      a plunger having a closed end opposite an open end, said plunger having an interior plunger wall with a spring lip,
      a holding collar slidably received within said open end, and
      a collar spring disposed between said spring lip and said holding collar for biasing said holding collar, said holding collar carrying the ring until engaged by the cylindrical device, whereupon said plunger assists in holding and pressing the ring onto the cylindrical device.

2. The tool according to claim 1, wherein said interior plunger wall also has a sleeve lip, the tool further comprising:
   a sleeve secured to said sleeve lip, said sleeve having a shoulder extending outwardly from one end thereof;
   said holding collar having an inwardly extending ledge, said holding collar slidably movable between said sleeve and said interior plunger wall, said collar spring biasing said ledge against said shoulder.

3. The tool according to claim 1, wherein said plunger has an exterior plunger wall connected to said interior plunger wall by a tapered end at said open end.

4. An installation tool for installing an anti-flashover ring on a bushing insert, the tool comprising:
   a housing having a cap at one end and a cup at an opposite end, said cap having a hole therethrough to receive a remote operating tool, said cup having a closed end with a bore therethrough adjacent said cap, and an open end opposite said closed end, said cup having a substantially flat cup edge at said open end;
   a rod slidably moveable in said bore, one end of said rod slidably mounted in said cap;
   a plunger slidably received in said cup, said plunger having a closed end with a rod hole therethrough, said rod fixed to said rod hole, said plunger having an open end opposite said plunger closed end, said plunger open end facing the same direction as said open end of said cup, said plunger open end having an insert cavity into which said rod coaxially extends, said plunger having an interior plunger wall with a sleeve lip and a spring lip;
   a spring disposed between said plunger and said cup;
   a sleeve mounted adjacent said sleeve lip;
   a holding collar slidably movable between said sleeve and said interior plunger wall and retained within said plunger; and
   a collar spring disposed between said holding collar and said spring lip;
   said holding collar frictionally receiving the ring, wherein an operator positions the installation tool such that the rod is received by the bushing insert, the holding collar aligns the ring onto a shoulder of the bushing insert, wherein the shoulder pushes the holding collar until said plunger engages the anti-flashover ring to complete positioning of the ring onto the shoulder, and wherein the shoulder and the ring slidably move the plunger until engaged by said cup edge which completely pushes the ring onto the shoulder.

5. The installation tool according to claim 4, wherein said plunger has an exterior plunger wall connected to said interior plunger wall by a tapered end, said tapered end engaging the ring during installation to slightly expand the inner diameter of the ring to facilitate installation onto the shoulder.

6. A tool for installing a ring onto a cylindrical device, comprising:
   a housing having an inner wall with an extending edge, and having an opening at said extending edge;
   a plunger slidably received within said housing and axially movable between extended and retracted positions with respect to said housing, said plunger having an inner surface, opposing closed and open ends, and an inner cavity; and
   a collar slidably received within said inner cavity at said open end of said plunger and having a ring retaining surface;
   whereby when said plunger is in the extended position, the ring is disposed on said ring retaining surface of said collar and the cylindrical device is received within said collar, and when said plunger is in the retracted position, said extending edge of said housing presses the ring onto the cylindrical device.

7. A tool according to claim 6, wherein
said open end of said plunger has a tapered surface that engages the ring when said plunger is in the retracted position facilitating the removal of the ring from said ring retaining surface.

8. A tool according to claim 6, wherein
a spring is disposed between said plunger and said housing.

9. A tool according to claim 6, wherein
a collar spring is disposed between said collar and said inner surface of said plunger.

10. A tool according to claim 6, wherein
a sleeve is received within said plunger and has an outer surface, and said collar is disposed between said inner surface of said plunger and said outer surface of said sleeve.

11. A tool according to claim 6, wherein said housing includes a positioning rod fixedly attached within said housing and slidably received within said plunger, positioning the cylindrical device when the cylindrical device is disposed within said collar.

12. A tool for installing a ring onto a cylindrical device, comprising:

a housing having an inner wall with an extending edge, and having an opening at said extending edge;

a plunger slidably received within said housing and axially movable between extended and retracted positions with respect to said housing, said plunger having an inner surface, opposing closed and open ends, and an inner cavity;

a collar slidably received within said inner cavity at said open end of said plunger and having a ring retaining surface; and a ring disposed on said ring retaining surface;

whereby when said plunger is in the extended position, said ring is disposed on said ring retaining surface of said collar and the cylindrical device is received within said collar, and when said plunger is in the retracted position, said extending edge of said housing engages and presses said ring onto the cylindrical device.

13. A tool according to claim 12, wherein said open end of said plunger has a tapered surface that engages said ring when said plunger is in the retracted position facilitating the removal of said ring.

14. A tool according to claim 12, wherein a spring is disposed between said plunger and said housing.

15. A tool according to claim 12, wherein a collar spring is disposed between said collar and said inner surface of said plunger.

16. A tool according to claim 12, wherein a sleeve is received within said plunger and has an outer surface, and said collar is disposed between said inner surface of said plunger and said outer surface of said sleeve.

17. A tool according to claim 12, wherein said housing includes a positioning rod fixedly attached within said housing and slidably received within said plunger, positioning the cylindrical device when the cylindrical device is disposed within said collar.

* * * * *